United States Patent [19]
Blount et al.

[11] Patent Number: 6,054,152
[45] Date of Patent: Apr. 25, 2000

[54] ANTI-CHOKING CANDY DESIGN

[76] Inventors: Terry N. Blount; Jeanne Blount, both of P.O. Box 209, Wayne, Okla. 73095-0209

[21] Appl. No.: 09/137,051

[22] Filed: Aug. 20, 1998

[51] Int. Cl.[7] .................................................. A23L 1/16
[52] U.S. Cl. ............................ 426/75; 426/104; 426/143; 426/660
[58] Field of Search .................................... 426/143, 660, 426/75, 104

[56] References Cited

U.S. PATENT DOCUMENTS

| | | | |
|---|---|---|---|
| 5,069,914 | 12/1991 | Gagliardi, Jr. ............................. | 426/76 |
| 5,500,178 | 3/1996 | Hayashi et al. ....................... | 246/297.8 |
| 5,676,982 | 10/1997 | Duchow et al. ......................... | 425/298 |
| 5,820,437 | 10/1998 | Coleman et al. ....................... | 446/196 |

FOREIGN PATENT DOCUMENTS 2441341   7/1980   France .

*Primary Examiner*—Nina Bhat

[57] ABSTRACT

An anti-choking candy design for allowing air to pass through an object of candy lodged in the throat of a user so that the user can still breathe. The candy design includes a mass of candy having at least three bores therethrough designed for permitting the passage of air through the mass of candy.

13 Claims, 2 Drawing Sheets

ANTI-CHOKING CANDY DESIGN

BACKGROUND OF THE INVENTION

1. Field of the Invention

The present invention relates to candies and more particularly pertains to a new anti-choking candy design for allowing air to pass through an object of candy lodged in the throat of a user so that the user can still breathe.

2. Description of the Prior Art

The use of candies is known in the prior art. More specifically, candies heretofore devised and utilized are known to consist basically of familiar, expected and obvious structural configurations, notwithstanding the myriad of designs encompassed by the crowded prior art which have been developed for the fulfillment of countless objectives and requirements.

Known prior art candies include U. S. Pat. No. 5,069,914; U.S. Pat. No. Des. 287,780; U.S. Pat. No. Des. 301,559; U.S. Pat. No. Des. 313,689; U.S. Pat. No. Des. 244,566; and U.S. Pat. No. Des. 314,855.

While these devices fulfill their respective, particular objectives and requirements, the aforementioned patents do not disclose a new anti-choking candy design. The inventive device includes a mass of candy having at least three bores therethrough designed for permitting the passage of air through the mass of candy.

In these respects, the anti-choking candy design according to the present invention substantially departs from the conventional concepts and designs of the prior art, and in so doing provides an apparatus primarily developed for the purpose of allowing air to pass through an object of candy lodged in the throat of a user so that the user can still breathe.

SUMMARY OF THE INVENTION

In view of the foregoing disadvantages inherent in the known types of candies now present in the prior art, the present invention provides a new anti-choking candy design construction wherein the same can be utilized for allowing air to pass through an object of candy lodged in the throat of a user so that the user can still breathe.

The general purpose of the present invention, which will be described subsequently in greater detail, is to provide a new anti-choking candy design apparatus and method which has many of the advantages of the candies mentioned heretofore and many novel features that result in a new anti-choking candy design which is not anticipated, rendered obvious, suggested, or even implied by any of the prior art candies, either alone or in any combination thereof.

To attain this, the present invention generally comprises a mass of candy having at least three bores therethrough designed for permitting the passage of air through the mass of candy.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-choking candy design apparatus and method which has many of the advantages of the candies mentioned heretofore and many novel features that result in a new anti-choking candy design which is not anticipated, rendered obvious, suggested, or even implied by any of the prior art candies, either alone or in any combination thereof.

It is another object of the present invention to provide a new anti-choking candy design which may be easily and efficiently manufactured and marketed.

It is a further object of the present invention to provide a new anti-choking candy design which is of a durable and reliable construction.

An even further object of the present invention is to provide a new anti-choking candy design which is susceptible of a low cost of manufacture with regard to both materials and labor, and which accordingly is then susceptible of low prices of sale to the consuming public, thereby making such anti-choking candy design economically available to the buying public.

Still yet another object of the present invention is to provide a new anti-choking candy design which provides in the apparatuses and methods of the prior art some of the advantages thereof, while simultaneously overcoming some of the disadvantages normally associated therewith.

Still another object of the present invention is to provide a new anti-choking candy design for allowing air to pass through an object of candy lodged in the throat of a user so that the user can still breathe.

Yet another object of the present invention is to provide a new anti-choking candy design which includes a mass of candy having at least three bores therethrough designed for permitting the passage of air through the mass of candy.

Still yet another object of the present invention is to provide a new anti-choking candy design that also allows easy extraction of the candy from the throat of the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 4 thereof, a new anti-choking candy design embodying the principles and concepts of the present invention will be described.

As best illustrated in FIGS. 1 through 4, the anti-choking candy design generally comprises a mass of candy 10 having at least three bores 11,12,13 therethrough designed for permitting the passage of air through the mass of candy 10.

Specifically, the mass of candy 10 preferably is a type of hard candy, however, the candy may be made of any confection including gum and soft candy. The mass of candy 10 may also be formed into any shape including, but not limited to, spherical and disk-shaped masses of candy. The mass of candy 10 has at least three bores 11,12,13 therethrough. Each of the bores 11,12,13 is preferably generally cylindrical and has a longitudinal axis. The bores 11,12,13 are is designed for permitting the passage of air through the mass of candy 10. As an added benefit, the bores 11,12,13 also allow quicker dissolving of the mass of candy 10 in the throat of the user so that the blockage in the throat is reduced to permit air to pass through it. Thirdly, the bores 11,12,13 permit easier extraction of the mass of candy 10 with an instrument inserted into the mouth of the user and into one of the bores 11,12,13 so that the mass of candy 10 can be pulled out of the throat of the user with the instrument.

The longitudinal axis of each of the bores 11,12,13 is extended in substantially perpendicular direction from the longitudinal axes of the other bores 11,12,13 such that the longitudinal axis one of the bores 11 extended along a first axis, the longitudinal axis of another of the bores 12 is extended along a second axis perpendicular to the first axis, and the longitudinal axis of a third of the bores 13 is extended along a third axis perpendicular to the first and second axes. Each of the bores 11,12,13 also passes through a portion of each of the other bores such that each bore has an opening into the other bores to permit passage of air through one bore into the other bores. This way, if the one of the ends of one or more of the bores is blocked, by the side of the throat for example, air may still pass through the ends of the bores 11,12,13 that are not blocked thereby reducing the risk of a total obstruction of air through the throat. Each of the bores 11,12,13 has a diameter which is sufficiently large to permit passage of an amount of air therethrough sufficient to prevent asphyxiation of a user has the mass of candy 10 lodged in the throat of the user. Preferably, the diameters of the bores 11,12,13 are generally equal to each other.

Figure 1:
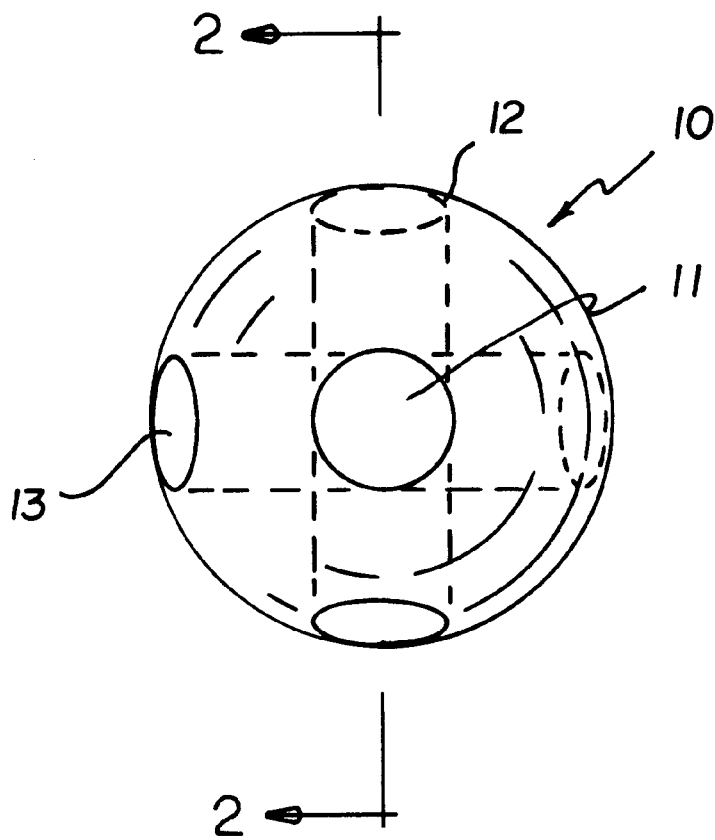
FIG. 1 is a schematic side view of a spherical embodiment a new anti-choking candy design according to the present invention.
Figure 2:
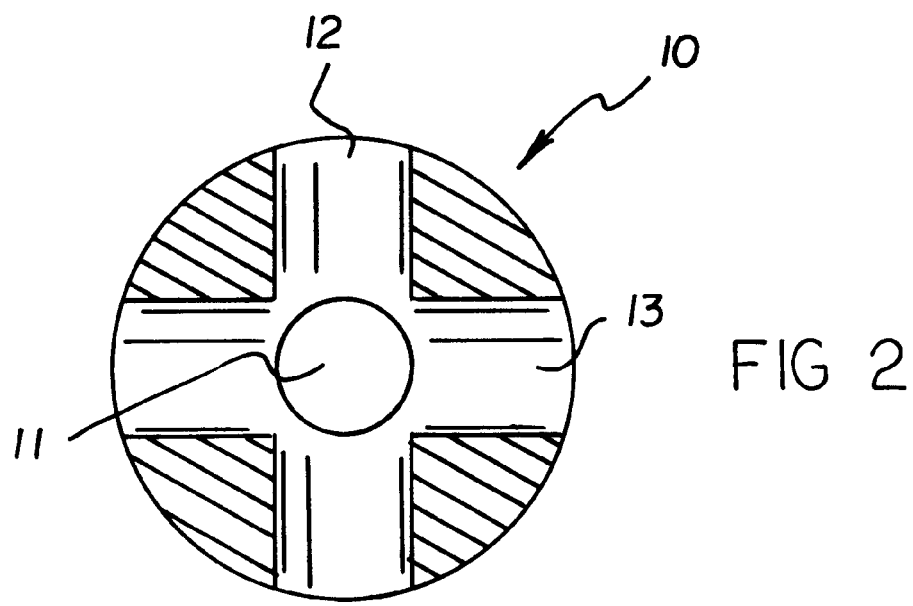
FIG. 2 is a schematic cross sectional view of the spherical embodiment of the present invention taken from line 2—2 of FIG. 1.

In one preferred embodiment, the mass of candy 10 is spherical in shape as illustrated in FIGS. 1 and 2. In this embodiment, the spherical mass of candy has a central axis extending therethrough with the longitudinal axis of one of the bores coaxial with the central axis of the spherical mass of candy and the longitudinal axis of a second and a third of the bores extending transversely through the center axis of the spherical mass of candy. In other words, the length of each of the bores extends across the diameter of the spherical mass of candy. Preferably, the diameter of each of the bores is greater than about one-sixth the diameter of the spherical mass of candy 10 and less than about one-half the diameter of the spherical mass of candy 10. Ideally, in this embodiment, the diameter of each of the bores is about one-fourth the diameter of the spherical mass of candy 10.

Figure 3:
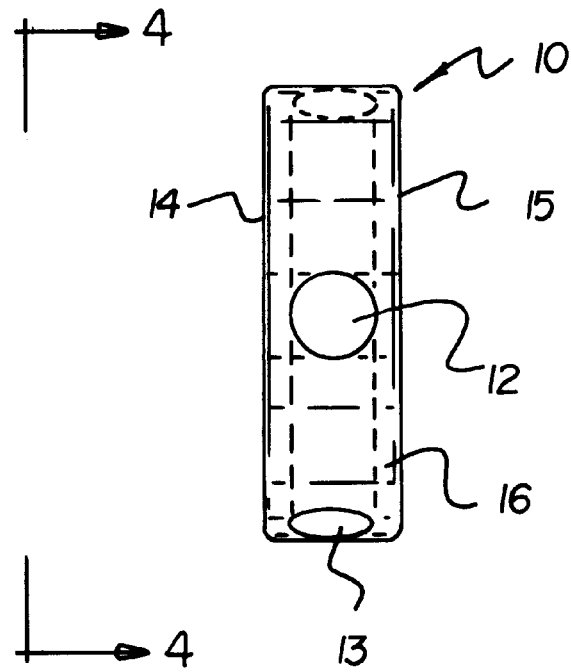
FIG. 3 is a schematic side view of a disk-shaped embodiment of the present invention.
Figure 4:
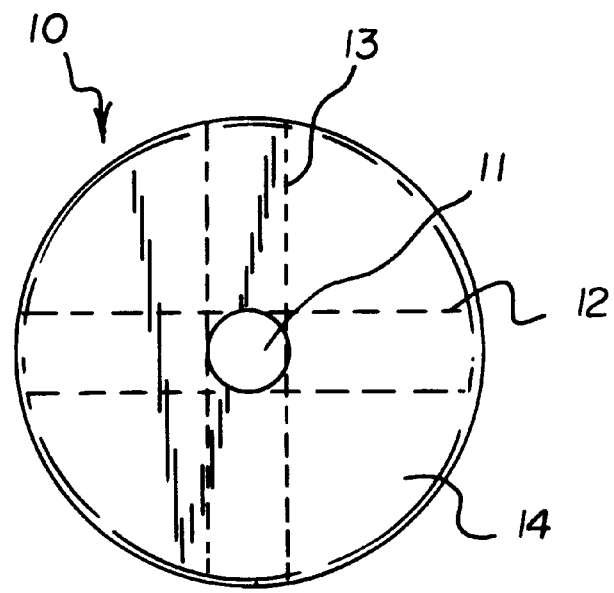
FIG. 4 is another schematic side view of the disk-shaped embodiment of the present invention as seen from the vantage of line 4—4 of FIG. 3.

With reference to FIGS. 3 and 4, in another preferred embodiment, the mass of candy is disk-shaped and has a pair of circular faces 14,15 and a side 16 extending around the perimeters of the faces 14,15. A first of the bores 11 is extended between the faces 14,15 of the disk-shaped mass of candy 10, ideally, through the centers of each of the circular faces 14,15. A second and third of the bores 12,13 are extended through the side 16 of the disk-shaped mass of candy 10. In this embodiment, the disk-shaped mass of candy has a center axis extending through the circular faces 14,15 of the disk shaped mass of candy 10. As illustrated in FIGS. 3 and 4, the longitudinal axis of the first of the bores 11 is coaxial with the center axis of the disk-shaped mass of candy 10 while the longitudinal axis of the second and third of the bores 12,13 extending transversely through the center axis of the disk-shaped mass of candy 10. The disk-shape mass of candy has a thickness defined between the circular faces 14,15 of the disk-shaped mass of candy. Preferably, the diameters of the bores in this embodiment are less than the thickness of the disk-shaped mass of candy. Even more preferably, the diameters of the bores are greater than about one-third the thickness of the disk-shaped mass of candy. Ideally, the diameters of the bores are greater than about one-half the thickness of the disk-shaped mass of candy.

In use, the mass of candy is placed in the mouth of the user. If the mass of candy is lodged in the throat of the user to become a blockage in the passage of air through the throat, the bores permit passage of sufficient amounts of air through the mass of candy (i.e., the blockage) to prevent the user from becoming asphyxiated before the mass of candy can be removed from the user's throat As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A food product, comprising:

a mass of candy; and said mass of candy having at least the bores therethrough, each of said bores having a longitudinal axis, each of said bores permitting the passage of air through said mass of candy, each of said bores intersecting each of the other bores in said mass such that each of said bores is in communication with the other of said bores;

wherein said longitudinal axis of each of said bores is extended in substantially perpendicular direction from said longitudinal axes of the other bore bores that the longitudinal axis one of the bores is extended along a first axis, the longitudinal axis of another of the bore is extended along a second axis perpendicular to said first axis, and said longitudinal axis of a third of said bores is extended along a third axis perpendicular to said first and second axes.

2. The food product of claim 1, wherein each of said bores is generally cylindrical, wherein each of said bores has a diameter, wherein said diameter of each of said bores is sufficiently large to permit passage of an amount of air therethrough sufficient to prevent asphyxiation of a user having said mass of candy lodged in the throat of the user.

3. The food product of claim 2, wherein said diameters of said bores are generally equal to each other.

4. The food product of claim 1, wherein said mass of candy is spherical in shape, wherein said spherical mass of candy has a central axis extending therethrough, said longitudinal axis of one of said bores being coaxial with said central axis of said spherical mass of candy, said longitudinal axis of a second and a third of said bores extending transversely through said center axis of said spherical mass of candy.

5. The food product of claim 4, wherein said spherical mass of candy has a diameter, wherein each of said bores has a diameter, wherein said diameter of each of said bores is greater than about one-sixth the diameter of said spherical mass of candy and less than about one-half the diameter of said spherical mass of candy.

6. The food product of claim 5, wherein said diameter of each of said bores is about one-fourth the diameter of said spherical mass of candy.

7. The food product of claim 1, wherein said mass of candy is disk-shaped and has a pair of circular faces and a side, a first of said bores being extended between said faces of said disk-shaped mass of candy, a second and third of said bores being extended through said side of said disk-shaped mass of candy.

8. The food product of claim 7, wherein said disk-shaped mass of candy has a center axis extending through said circular faces of said disk shaped mass of candy, said longitudinal axis of said first of said bores being coaxial with said center axis of said disk-shaped mass of candy, said longitudinal axis of said second and third of said bores extending transversely through said center axis of said disk-shaped mass of candy.

9. The food product of claim 7 wherein said disk-shape mass of candy has a thickness defined between said circular faces of said disk-shaped mass of candy, wherein each of said bores has a diameter, said diameters of said bores being less than said thickness of said disk-shaped mass of candy, wherein said diameters of said bores are greater than about one-third said thickness of said disk-shaped mass of candy.

10. The food product of claim 9, wherein said diameters of said bores are greater than about one-half said thickness of said disk-shaped mass of candy.

11. A food product comprising:

a mass of candy;

said mass of candy having at least three bores therethrough, each of said bores being generally cylindrical and having a longitudinal axis, each of said bores being for permitting the passage of air through said mass of candy;

said longitudinal axis of each of said bores being extended in substantially perpendicular direction from said longitudinal axes of the other bores such that the longitudinal axis one of the bores is extended along a first axis, the longitudinal axis of another of the bores is extended along a second axis perpendicular to said first axis, and said longitudinal axis of a third of said bores is extended along a third axis perpendicular to said first and second axes;

each of said bores passing through a portion the other bores such that each bore has a opening into the into the other bores to permit passage of air through one bore into the other bores;

each of said bores having a diameter, wherein said diameter of each of said bores is sufficient large to permit passage of air amount of air therethrough sufficient to prevent asphyxiation of a user having said mass of candy lodged in the throat of the user;

wherein said diameters of said bores are generally equal to each other; and wherein said mass of candy is spherical in shape, wherein said spherical mass of candy has a central axis extending therethrough, said longitudinal axis of one of said bores being coaxial with said central axis of said spherical mass of candy, said longitudinal axis of a second and a third of said bores extending transversely through said center axis of said spherical mass of candy, and wherein said spherical mass of candy has a diameter, each of said bores having openings at opposite ends of the bores, the openings of each of said bores being located at diametrically opposite locations on an exterior surface of the mass.

12. A food product, comprising;

a mass of candy;

said mass of candy having at least three bores therethrough, each of said bores being cylindrical and having a longitudinal axis, each of said bores permitting the passage of air through said mass of candy;

said longitudinal axis of each of said bores being extended in substantially perpendicular direction from said longitudinal axes of the other bores such that the longitudinal axis one of the bores is extended along a first axis, the longitudinal axis of another of the bores is extended along a second axis perpendicular to said first axis, and said longitudinal axis of a third of said bores is extended along a third axis perpendicular said first and second axes;

each of said bores passing through a portion of each of the other bores such that each bore has an opening into the other bores to permit communication of air through one bore into each of the other bores;

each of said bores having a diameter, wherein said diameter of each of said bores is sufficiently large to permit passage of an amount of air therethrough sufficient to prevent asphyxiation of the user having said mass of candy lodged in the throat of the user;

wherein said diameter of said bores are generally equal to each other, and wherein said mass of candy is disk-shaped and has a pair of circular faces and a peripheral side surface extending between said circular faces, a first of said bores being extended between said faces of said disk-shaped mass of candy and opening into each of said pair of circular faces, a second and third of said bores being extended through said side of said disk-shaped mass of candy and opening into diametrically opposite locations in said peripheral side surface, wherein said disk-shaped mass of candy has a center axis extending through a center of said circular faces of said disk shaped mass of candy, said longitudinal axis of said first of said bores being coaxial within said center axis of said disk-shaped mass of candy, said longitudinal axis of said second and third of said bores extending transversely through said center axis of said disk-shaped mass of candy.

13. The food product of claim 12, wherein said disk-shape mass of candy has a thickness defined between said circular faces of said disk-shaped mass of candy, said diameters of said bores being less than said thickness of said disk-shaped mass of candy, and wherein said diameters of said bores are greater than about one-half said thickness of said disk-shaped mass of candy.

* * * * *